United States Patent
Guerrero

(10) Patent No.: US 7,349,981 B2
(45) Date of Patent: Mar. 25, 2008

(54) SYSTEM, APPARATUS, AND METHOD FOR STRING MATCHING

(75) Inventor: Miguel A Guerrero, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 916 days.

(21) Appl. No.: 10/740,435

(22) Filed: Dec. 18, 2003

(65) Prior Publication Data

US 2005/0138322 A1   Jun. 23, 2005

(51) Int. Cl.
 *G06F 15/16* (2006.01)
(52) U.S. Cl. .................. 709/238; 709/245; 709/239; 711/220; 370/392
(58) Field of Classification Search .............. 709/245, 709/220, 238; 370/389, 392; 711/220
See application file for complete search history.

(56) References Cited

U.S. PATENT DOCUMENTS

| | | | |
|---|---|---|---|
| 6,560,229 B1* | 5/2003 | Kadambi et al. | 370/392 |
| 6,691,171 B1* | 2/2004 | Liao | 709/245 |
| 7,212,531 B1* | 5/2007 | Kopelman et al. | 370/392 |
| 2005/0013308 A1* | 1/2005 | Wybenga et al. | 370/396 |

* cited by examiner

*Primary Examiner*—William Vaughn
*Assistant Examiner*—Djenane Bayard
(74) *Attorney, Agent, or Firm*—Buckley, Maschoff & Talwalkar LLC

(57) ABSTRACT

A system, an apparatus, and a method for dividing an address into at least two parts and searching for an address from a table that matches at least a significant portion of one of those parts. Where a table address having an exact match to a part of the address is found, additional parts of the address may be matched to one or more table addresses iteratively.

18 Claims, 3 Drawing Sheets

SYSTEM, APPARATUS, AND METHOD FOR STRING MATCHING

BACKGROUND

Address matching is a component of a common process used to determining to what node information, such as a packet of information, should be passed in a network of nodes. As information is routed through nodes of the network in transit from a source node to a destination node, each node through which the information passes may search a database of destination networks or nodes to which the current node is coupled to find the node having an address most nearly matching the most significant portion of the address of the destination node. The information may then be passed to the next hop node associated with that most nearly matching address.

BRIEF DESCRIPTION OF THE DRAWINGS

The accompanying drawings, wherein like reference numerals are employed to designate like components, are included to provide a further understanding of partial address matching, are incorporated in and constitute a part of this specification, and illustrate embodiments of partial address matching that together with the description serve to explain the principles of partial address matching.

In the drawings.

DETAILED DESCRIPTION

Figure 1:
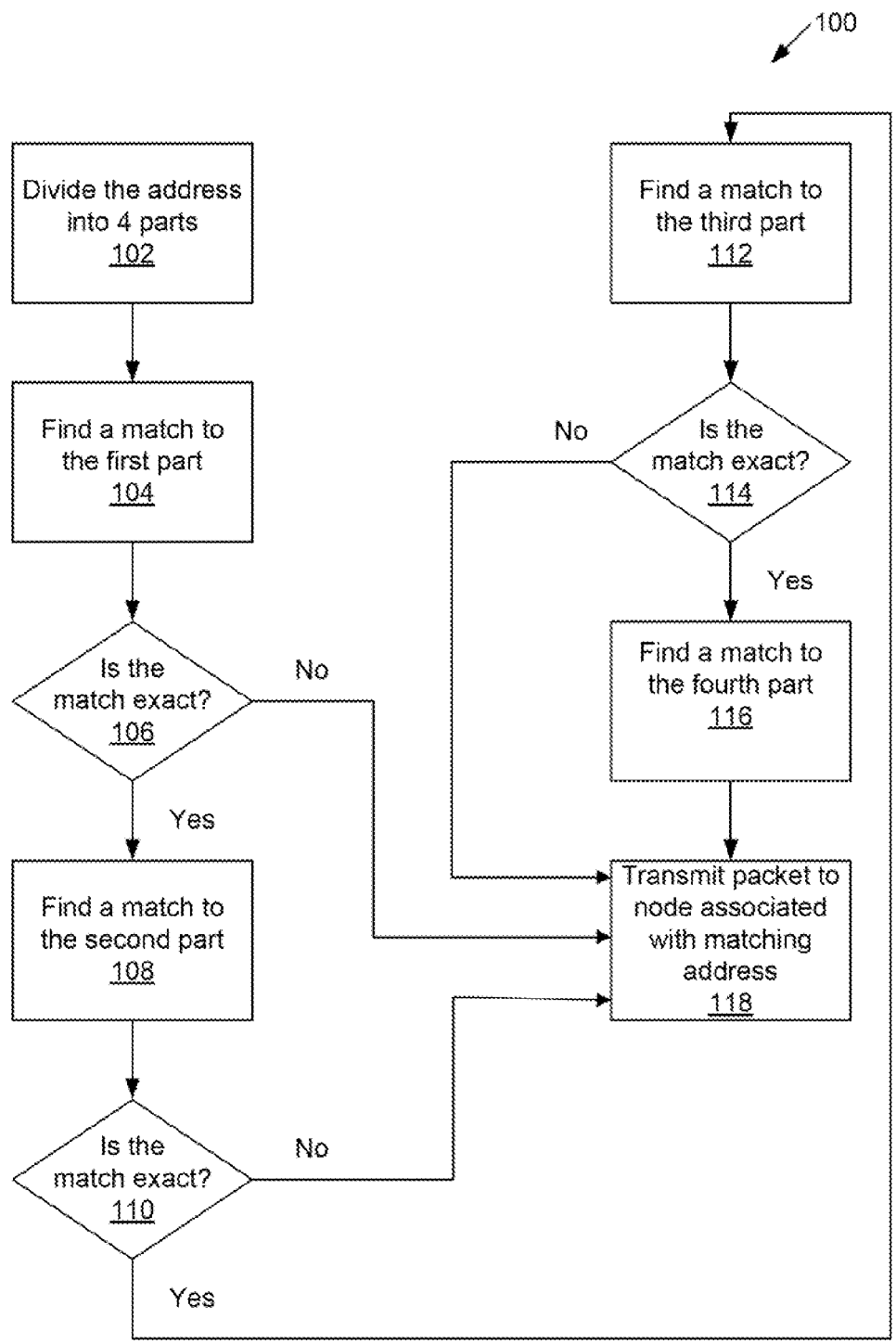
FIG. 1 illustrates an embodiment of a partial address matching method.

Reference will now be made to embodiments of partial address matching, examples of which are illustrated in the accompanying drawings. Details, features, and advantages of partial address matching will become further apparent in the following detailed description of embodiments thereof.

One or more methods of matching an address or a portion of an address of approximately 32-bits or less have been developed. Methods for finding a match to, or a partial match to a 32-bit address are commonly used when searching for a node address to which to transmit a packet in an Internet Protocol (IP) version 4 (IPv4) based network. Internet Protocol version 6 (IPv6), however is proposed to utilize 128-bit addresses and certain of the methods of matching a 32-bit address have processing requirements that increase substantially as the number of bits in the address increase. Thus, apparatuses, methods and systems for dividing an address into two or more parts and matching one of more parts are provided to minimize processing requirements for address matching.

IPv4 is defined by Internet Engineering Task Force (IETF) standard 5, Request for Comment (RFC) 791 and was adopted in September, 1981, while IPv6 is defined by IETF RFC 2460 and was published in December, 1998. Both IP standards are available from www.ieff.org.

Any reference in the specification to "one embodiment," "a certain embodiment," or a similar reference to an embodiment is intended to indicate that a particular feature, structure, or characteristic described in connection with the embodiment is included in at least one embodiment of the invention. The appearances of such terms in various places in the specification are not necessarily all referring to the same embodiment. References to "or" are furthermore intended as inclusive so "or" may indicate one or the other ored terms or more than one ored term.

When, for example, a packet is being transmitted from a source node to a destination node through one or more intermediate nodes, a method for matching one or more portions of the destination node address may operate in one or more intermediate nodes used to transmit the packet through a network. Where one or more exact matches is found to a first part of the destination node address, additional searches may be made iteratively to further refine a match to other portions of the destination node address.

In a typical network, node addresses may be globally unique with nodes in portions of the network having addresses with matching initial characters in their addresses, indicating that those nodes are in a common section of the network, but with one or more globally unique characters at the end of the address. A certain destination node may thus be defined as a subset of a section of a network where a beginning portion or prefix of the address for that destination node is the same as addresses for intermediate nodes and other destination nodes in the same network. Thus, a packet may be transmitted to nodes having addresses with ever increasing matches to early characters of the destination node. When a search results in a match to a node having the entire destination address, the destination node is the matching node and the packet may be transmitted to that destination node.

Classless Inter-Domain Routing (CIDR) has been widely adopted for routing on the Internet and other networks. CIDR requires Internet routers to search addresses, or portions of addresses that are typically the first characters in the addresses, and thus referred to as prefixes, of variable length to find a longest matching address in a router table. In that way, a packet traversing the router may be transmitted to the destination node or an intermediate node that is more closely related to the destination node.

One method of finding a neighboring node that is most closely related to the destination node in CIDR is called Longest Prefix Matching (LPM). LPM may find an address in a router table that matches the greatest number of most significant characters of the address. In our examples, as in most current Internet Protocol standards, those most significant characters will be the first characters of an address, and will be referred to as the address prefix. Thus, a best matching address in a router table will be an address that has the most characters matching the destination node beginning with the first characters and continuing with adjacent characters. Those characters are often, furthermore, all digits so that "characters" and "digits" may be used interchangeably.

Since LPM has been found to work well with 32-bit addresses and calculations for finding a best matching address using LPM is believed to become significantly more difficult as a number of bits in an address increase beyond 32-bits, simplified methods, apparatuses, and systems for matching a longer address using LPM are disclosed herein. One example application for those simplified methods, apparatuses, and systems is in an IPv6 system wherein addresses are 128 bits in length. LPM may also perform a search for an address that includes wildcard symbols. Wildcard symbols indicate that a match may include any value at the wildcard location. Thus matching may be performed in several ways, including: (i) exactly for an entire address, (ii) to a desired level where characters are organized in a hierarchy, or (iii) matching an address except for locations where wildcards are present. Where wildcards are present, they are typically contiguous and occupy the least significant bits of the address. Moreover, when matching a partial address, by using a desired level or wildcards for example, multiple matches may be made to a single query in a system wherein every address is unique, but portions of addresses may match. LPM may dictate that where such multiple matches result, an address having the fewest number of characters masked by wildcards is the best result of the search so that the result matching all characters not masked by wildcards and having the longest string of characters that are masked by wildcards, starting with the first masked character, would be reported as the result of the search.

FIG. 1 illustrates an embodiment of a method of matching a selected or received address to a most closely matching table address by dividing the selected or received address into at least two parts and matching parts of the address 100. At 102, characters in the selected or received address to be matched are divided into at least first and second parts. Those characters may be bits, numbers, letters, or other discrete characters. In the example that will be provided in connection with FIG. 1, the selected or received address will be 128-bits in length and will be divided into four 32-bit sections. Moreover, the selected or received address will be a string of digits representing a destination node address, transmitted in a packet header that was received by a router acting as an intermediate node in an IPv6 application. The destination address is to be matched, or attempted to be matched, to an address in a router table contained within or accessed by the router. The packet is then to be transmitted from the router to a node having an address most closely matching the destination address, taking into account a hierarchy of significance of digits in the address.

At 104, a router table address having a match to the most significant of the four parts of the destination address is identified. To do so, a longest prefix match may be performed to compare the most significant part of the destination address to corresponding portions of table addresses in the router table. In IP addressing, the first digits of an address are typically the most significant, so the most significant part of the addresses will be the first digits in this example. It should be recognized, however, that address searching may be performed where last digits are most significant by comparing a portion of the last digits of an address and searching for a longest suffix match. Other arrangements of most significant digits may also be matched using address division and matching 100 where the most significant digits are identified and searched first.

At 106, if a match is found at 104 and that match is not exact, then the table address having the longest prefix match may be identified and the packet may be transmitted to the node having that identified address at 118, thus eliminating any need to search for a match to the other three parts of the destination address and eliminating three quarters of the searching effort that would be required to search for a match to all of the characters in the destination address.

If an exact match to the first part of the destination address is found in the router table, then a longest prefix match or other match if desired may be performed for the second part of the destination address at 108. Moreover, the match for the second part may be performed only for router table addresses that exactly match the first part of the destination address. Furthermore, an exact match may require matching of digits masked by wildcards that were not required to be matched for an inexact match.

If no match is found at 104, matching may be considered to have failed. Such a no match condition may exist where no address in the router table includes all of the destination address characters not masked by wildcards in the first or most significant part of the address. When matching fails, a variety of actions may be taken by the router, including informing the transmitting node of the match failure and terminating transmission of the packet through the router, or transmitting the packet to a default node where an attempt at matching may again be performed. It should be noted that the method of matching an address that has been divided into at least two parts 100 may be performed on a packet in each source and intermediate node transmitting the packet.

At 110, if no match was found at 108, then the packet may be transmitted to the node having the table address that matched the first part of the destination address at 118. If a match that was not exact was found for the second part at 108, then the table address that matches the first part of the destination address and that has the longest prefix match to the second part of the destination address may be identified and the packet may be transmitted to the node having that address at 118.

At 110, if an exact destination address match in the router table was found at 108 for the first two parts of the destination address, then a longest prefix match may be performed for the third part of the router table addresses that match the first two parts of the destination address at 112.

If no match is found at 112, then at 114 the packet may be transmitted to the node having the table address that matched the first and second parts of the destination address at 118. If a match to the third part of the destination address that was not exact was found at 112, then the table address that matches the first and second parts of the destination address and that has the longest prefix match to the third part of the destination address may be identified at 114 and the packet may be transmitted to the node having that address at 118.

At 114, if an exact destination address match is found in the router table for the first three parts of the destination address, then a longest prefix match may be performed for the fourth part of the router table addresses that were previously found to match the destination address in their first three parts at 116.

If no match to the fourth part of the destination address is found at 116, then the packet may be transmitted to the node having the table address that matched the first through third parts of the destination address at 118. If a match that is not exact is found at 116, then the table address that matches the first through third parts of the destination address and that has the longest prefix match to the fourth part of the destination address may be identified and the packet may be transmitted to the node having that address at 118. Where IP addresses are globally unique, a router table address that matches the destination address in all four parts would indicate that the destination address has been located and the packet may be transmitted to the destination node having that address at 118.

At 118, the packet is transmitted to the address most closely matching the destination address, as determined by matching one or more of the parts of the destination address. Routing information for the node associated with the router table address most closely matches the destination address may be associated with the router table address and may be read from the router table to determine that routing.

It should be noted that two or more parts of the selected or received address may be searched simultaneously so that an address or parts of the address may be searched in a parallel fashion, which may be faster than a sequential fashion.

In another embodiment, a search may be made for an exact match to those one or more parts initially and then a longest prefix matching search may be performed for other parts if that exact match is found. If an exact match is not found to the one or more parts, to which an exact match was expected to be found, an LPM search may be performed on each portion as described hereinbefore. That approach may further increase efficiency of an address look-up or similar search by reducing the amount of processing necessary for such a match.

Thus, for example, a search for a router table address matching a 128-bit destination address may divide the addresses into four 32-bit parts. An exact match search may then be performed on the first two parts and LPM searches may be performed on the third and fourth parts of the address as described in the method 100 illustrated in FIG. 1 if an exact match to the first two parts is found. If an exact match to the first two parts is not found, LPM queries could be performed on the first and second parts to find the closest match available. That approach provides a reduction in the overall number of queries required to find an exact match from four LPM searches for an address divided into four parts to one exact match plus two LPM matches regardless of whether an exact match is found to the first two parts.

Searching for one or more exact matches in combination with one or more LPM searches may be performed flexibly in many different combinations. For example in an address composed of eight parts, an exact match could be performed on the first four parts. If a match to the first four parts is not found, then an exact match search could be performed on the first two parts. If an exact match is not found to the first two parts, then LPM searching could operate on the address beginning from the first part. If an exact match is found to the first two parts, then LPM searching could begin at the third part.

If a match is found to the first four parts, another exact match could be performed on the fifth and sixth parts of the address. If an exact match is found to the fifth and sixth parts, LPM searching could begin at the seventh part and, if an exact match is not found to the fifth and sixth parts, LPM searching could begin at the fifth part. Accordingly, a search for a longest match to an address having eight parts with 16 bits per part might be performed with two exact match queries of 64 bits and 32 bits respectively and two LPM queries of 16 bits each. Thus, many possibilities exist for efficient searching with LPM searching beginning after the longest successful exact match.

In an embodiment of the method of matching an address that has been divided into at least two portions 100, addresses in the router table may be divided into fields corresponding to the division of the destination node address such that the first part of the destination address may be compared to the first field of the router table addresses, the second part of the destination address may be compared to the second field of the router table addresses, and additional parts of the destination address may be compared to additional fields of the router table addresses.

It should be noted that the addresses may be divided in any desired way or into any desired number of parts and that those parts may be of equal or unequal size. For example, a 128-bit address may be divided into three fields of 43-bits, 43-bits and 42-bits and those fields may be searched in a three part process similar to the four part process described in connection with FIG. 1. Alternately, the sizes of each part may be optimized based, for example, on the statistical nature of searching a particular match or type of match. For example, when matching a 128-bit address, wherein 80% of the addresses in the router table have the same first 80 bits, searching could be performed on a first part of 40 bits, a second part of 40 bits, a third part of 24 bits and a fourth part of 24 bits.

An embodiment of an article of manufacture may include a computer readable medium that, when executed, performs the method 100 or portions thereof.

Figure 2:
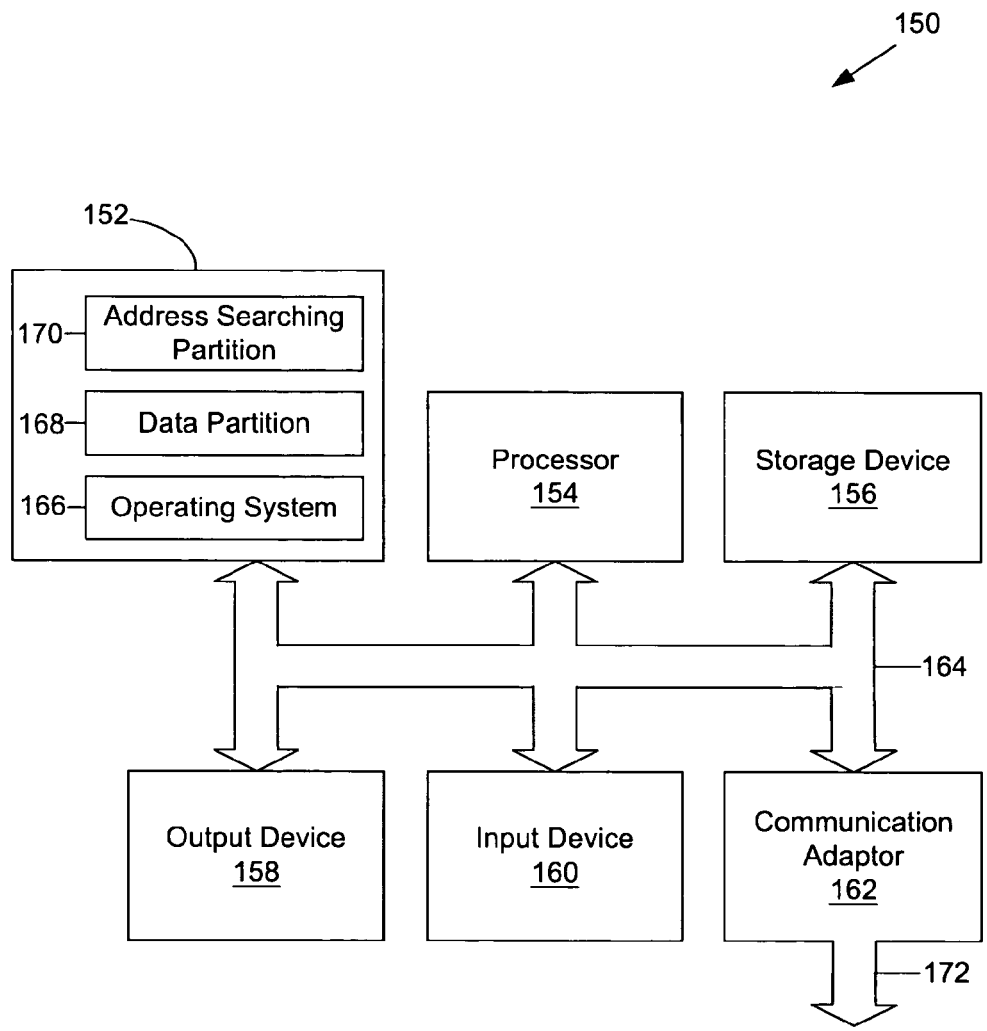
FIG. 2 illustrates an embodiment of a partial address matching device.

FIG. 2 illustrates an address matching device 150 that may, for example, act as a network router. Such a router may receive a packet that includes an address of a destination node in its header, compare that header to a router table containing addresses to which the router may transmit the packet, and transmit the packet to the node having an address that most closely matches the destination node address.

The address matching device 150 includes memory 152, a processor 154, a storage device 156, an output device 158, an input device 160, and a communication adaptor 162. It should be recognized that any or all of the components 152-162 of the address matching device 150 may be implemented in a single machine. For example, the memory 152 and processor 154 might be combined in a state machine or other hardware based logic machine. Communication between the processor 154, the storage device 156, the output device 158, the input device 160, and the communication adaptor 162 may be accomplished by way of one or more communication busses 164.

The memory 152 may, for example, include random access memory (RAM), dynamic RAM, and/or read only memory (ROM) (e.g., programmable ROM, erasable programmable ROM, or electronically erasable programmable ROM) and may store computer program instructions and information. The memory 152 may furthermore be partitioned into sections including an operating system partition 166, wherein instructions may be stored, a data partition 168 in which data may be stored, and an address searching partition 170 in which instructions for matching a destination address in a packet to an available next hop node address may, for example, be stored. The address searching partition 170 may also allow execution by the processor 154 of the instructions stored in the address searching partition 170. The data partition 168 may furthermore store data to be used during the execution of the program instructions such as, for example, a routing table.

The processor 154 may execute the program instructions and process the data stored in the memory 152. In one embodiment, the instructions are stored in memory 152 in a compressed and/or encrypted format. As used herein the phrase, "executed by a processor" is intended to encompass instructions stored in a compressed and/or encrypted format, as well as instructions that may be compiled or installed by an installer before being executed by the processor 154.

The storage device 156 may, for example, be a magnetic disk (e.g., floppy disk or hard drive), optical disk (e.g., CD-ROM) or any other device or signal that can store digital information. The communication adaptor 162 may permit communication between the address matching device 150 and other devices or nodes coupled to the communication adaptor 162 at a communication adaptor port 172. The communication adaptor 162 may be a network interface that transfers information from nodes on a network such as the network 200 illustrated in FIG. 3, to the address matching device 150 or from the address matching device 150 to nodes on the network 200. The network in which the address matching device 150 operates may alternately be a LAN, WAN, or the Internet. It will be recognized that the address matching device 150 may alternately or in addition be coupled directly to one or more other devices through one or more input/output adaptors (not shown).

The address matching device 150 may also be coupled to one or more output devices 158 such as, for example, a monitor or printer, and one or more input devices 160 such as, for example, a keyboard or mouse. It will be recognized, however, that the address matching device 150 does not necessarily need to have any or all of those output devices 158 or input devices 160 to operate. It should also be recognized that the address matching device 150 may have fewer components than shown in FIG. 2.

The elements 152, 154, 156, 158, 160, and 162 of the address matching device 150 may communicate by way of one or more communication busses 164. Those busses 164 may include, for example, a system bus, a peripheral component interface bus, and an industry standard architecture bus.

The network in which address searching is implemented may be a Local Area Network (LAN), Wide Area Network (WAN), the Internet or another network of nodes. Those nodes may range from personal computers to high-end mainframe computers and supercomputers, and may include dumb terminals, boards or blades in a chassis or other, typically processor-based, devices interconnected by one or more forms of communication media. Those nodes may furthermore act, for example, as routers, switches, servers, and clients. The communication media coupling those devices may include, for example, twisted pair, co-axial cable, optical fibers and wireless communication methods such as use of radio frequencies.

Nodes may operate as source nodes, destination nodes, intermediate nodes or a combination of those source nodes, destination nodes, and intermediate nodes. Information may furthermore be passed from source nodes to destination nodes, often through one or more intermediate nodes such as routers. Information may comprise any data capable of being represented as a signal, such as an electrical signal, optical signal, acoustical signal and so forth. Examples of information in this context may include a packet of data being sent from a source node to a destination node that carries header data, such as a destination node address, used by intermediate nodes to direct the packet to the destination node.

Network nodes may be equipped with the appropriate hardware, software or firmware necessary to communicate information in accordance with one or more protocols. A protocol may comprise a set of instructions by which the information is communicated over the communications medium. Protocols are, furthermore, often layered over one another to form something called a "protocol stack." In an embodiment, the network nodes that are performing address matching operate in accordance with the IPv6 network protocol layer.

Figure 3:
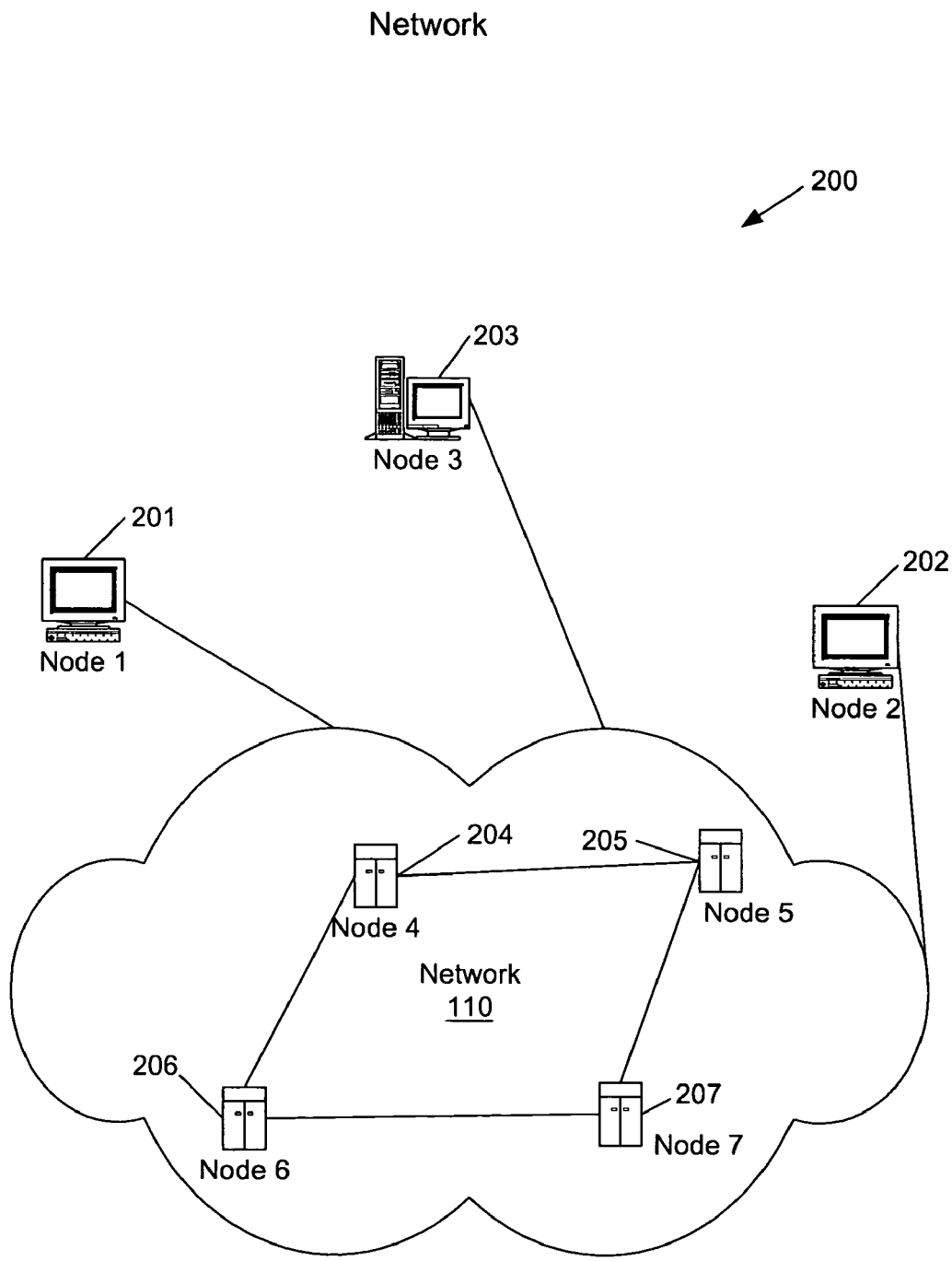
FIG. 3 illustrates a network in which an embodiment of partial address matching may take place.

FIG. 3 illustrates a network 200 in which address matching may be implemented. Node 1 201, node 2 202, and node 3 203 are client nodes that typically act as both source nodes and destination nodes in two-way communications. Node 4 204, node 5 205, node 6, 206 and node 7 207 are routers that typically transmit information from source nodes to destination nodes, acting as intermediate nodes. Thus, for example, address matching, as described herein, may occur in one or more of the routers 204-207 in a typical network, as well as the client nodes when operating as source nodes.

While the systems, apparatuses, and methods of address matching have been described in detail and with reference to specific embodiments thereof, it will be apparent to one skilled in the art that various changes and modifications can be made therein without departing from the spirit and scope thereof. Thus, it is intended that the modifications and variations be covered provided they come within the scope of the appended claims and their equivalents.

What is claimed is:

1. A method comprising:
   receiving an identified address to match to a destination address;
   dividing the identified address into first and second parts;
   masking a portion of the first part with wildcards, wherein the masked portion is not required to be matched;
   if the unmasked portion of the first part does not match one or more addresses in a router table then:
      identifying a router table address having a longest prefix match to the unmasked portion of the first part of the identified address; and
   if an unmasked portion of the first part of the address exactly matches one or more addresses in a router table, then:
      matching the masked first portion to the one or more addresses in the router table; and
      if the masked first portion matches the one or more addresses in the router table then:
         masking a portion of the second part with wildcards, wherein the masked portion is not required to be matched; and
         matching the unmasked portion of the second part of the indentified address to determine a longest prefix match to the unmasked portion of the second part.

2. The method of claim 1, further comprising dividing the selected address into at least three parts.

3. The method of claim 2, wherein fewer than all parts of the selected address are matched.

4. The method of claim 1, wherein the first and second parts are of equal size.

5. The method of claim 1, wherein the first and second parts are not of equal size.

6. The method of claim 1, wherein the first and second parts include a plurality of characters and the characters in the first part are more significant than the characters in the second part.

7. The method of claim 6, wherein the router table address having the longest prefix match is the router table address having the longest continuous string of characters that match the one or more address in the router table.

8. The method of claim 6, wherein the first part of the identified address includes the first character of the identified address and the second part of the identified address includes the last character of the identified address.

9. The method of claim 1, further comprising selecting a default route if no table address is found having a longest prefix match to the first part of the selected address.

10. An address matching device, comprising:
    a storage device having a table of table addresses; and
    a processor having a selected address and to:
       receive an identified address to match to a destination address;
       divide the identified address into first and second parts;
       mask a portion of the first part with wildcards, wherein the masked portion is not required to be matched;
       if the unmasked portion of the first part does not match one or more addresses in a router table then:
          identify a router table address having a longest prefix match to the unmasked portion of the first part of the identified address; and if an unmasked portion of the first part of the address exactly matches one or more addresses in a router table, then:
  match the masked first portion to the one or more addresses in the router table; and
  if the masked first portion matches the one or more addresses in the router table then:
    mask a portion of the second part with wildcards, wherein the masked portion is not required to be matched; and
    match the unmasked portion of the second part of the identified address to determine a longest prefix match to the unmasked portion of the second part.

11. The address matching device of claim 10, wherein the router table is included in a database.

12. The address matching device of claim 10, wherein the processor is further to transmit a packet of information containing the identified address to a node having the router table address identified.

13. The address matching device of claim 10, wherein the processor returns a packet of information containing the selected address to a node from which the packet was received if no router table address has a longest prefix match to the first part of the identified address.

14. The address matching device of claim 10, wherein the processor transmits a packet of information containing the identified address to a default node if no table address has a longest prefix match to the first part of the identified address.

15. A router, comprising:
A communication adaptor coupled to a network to receive a packet having a destination address from a transmitting node coupled to the communication adaptor;
a storage device having a table of table addresses; and
a processor having a selected address and to:
  divide the destination address into first and second parts;
  mask a portion of the first part with wildcards, wherein the masked portion is not required to be matched;
  if the unmasked portion of the first part does not match one or more addresses in a router table then:
    identify a router table address having a longest prefix match to the unmasked portion of the first part of the destination address; and
  if an unmasked portion of the first part of the address exactly matches one or more addresses in a router table, then:
    match the masked first portion to the one or more addresses in the router table; and
    if the masked first portion matches the one or more addresses in the router table then:
      mask a portion of the second part with wildcards, wherein the masked portion is not required to be matched; and
      match the unmasked portion of the second part of the destination address to determine a longest prefix match to the unmasked portion of the second part.

16. The address matching device of claim 15, wherein the communication adaptor is further to transmit the packet to a node having the table address identified.

17. The address matching device of claim 15, wherein the communication adaptor is further to transmit the packet to a node from which the packet was received if no table address has a longest prefix match to the first part of the selected address.

18. The address matching device of claim 15, wherein the communication adaptor is further to transmit the packet to a default node if no table address has a longest prefix match to the first part of the selected address.

* * * * *